United States Patent [19]
Yeh et al.

[11] Patent Number: 5,632,942
[45] Date of Patent: May 27, 1997

[54] METHOD FOR PREPARING MULTILAYER CERAMIC/GLASS SUBSTRATES WITH ELECTROMAGNETIC SHIELDING

[75] Inventors: Tsung-Shou Yeh, Hsinchu; Shiang-Po Hwang, Tainan; Chien-Min Wang; Chung-Yu Ting, both of Hsinchu, all of Taiwan

[73] Assignee: Industrial Technoology Research Institute, Hsinchu, Taiwan

[21] Appl. No.: 67,359

[22] Filed: May 24, 1993

[51] Int. Cl.$^6$ .................................................. B29C 37/00
[52] U.S. Cl. ............................ 156/89; 427/131; 427/132; 428/426; 264/619
[58] Field of Search ........................ 264/60, 61, 63, 264/65, 66, 67, 58; 156/89; 428/694 ST, 426; 427/131, 132

[56] References Cited

U.S. PATENT DOCUMENTS

| | | | |
|---|---|---|---|
| 4,738,885 | 4/1988 | Matsumoto | 428/64 |
| 4,799,983 | 1/1989 | Desai | 264/58 |
| 4,806,188 | 2/1989 | Rellick | 264/58 |
| 4,806,295 | 2/1989 | Trickett | 264/58 |
| 4,833,001 | 5/1989 | Kijima et al. | 428/141 |
| 4,959,255 | 9/1990 | Suzuki | 428/143 |
| 5,006,182 | 4/1991 | Gantzhorn | 264/58 |
| 5,080,948 | 1/1992 | Morita et al. | 428/64 |
| 5,085,915 | 2/1992 | Taga et al. | 428/141 |
| 5,087,481 | 2/1992 | Chen et al. | 427/129 |
| 5,098,494 | 3/1992 | Reisman | 264/58 |
| 5,112,669 | 5/1992 | Yoden et al. | 428/141 |
| 5,302,328 | 4/1994 | Ezis | 264/58 |

*Primary Examiner*—Ellis Robinson
*Assistant Examiner*—Timothy M. Speer
*Attorney, Agent, or Firm*—W. Wayne Liauh

[57] ABSTRACT

A method for making multilayer ceramic/glass substrates with electromagnetic shielding. The method comprises the steps of: (a) preparing a homogeneous inorganic slurry composition by blending and milling a mixture containing ceramic or glass powders, or mixture thereof, an aqueous or organic solvent, a polymeric binder resin, a plasticizer, and other appropriate additives; (b) preparing a plurality of precursory ceramic/glass matrixes from the slurry using a tape casting, extrusion, coating, or pressing technique; (c) cutting the precursory ceramic/glass matrixes into a desired shape and size; (d) applying a conductive metal coating layer on at least one precursory ceramic/glass matrix to form a metal-coated precursory ceramic/glass matrix; (e) stacking an uncoated said precursory ceramic/glass matrix on top of at least one metal-coated precursory matrix to form a stacked multilayer precursory substrate; (f) laminating and sintering the stacked multilayer precursory substrate to form a sintered and densified ceramic/glass substrate. Finally the ceramic/glass substrate is trimmed and polished the desired size, shape, flatness and roughness. In a preferred embodiment, the substrate contains two metal coating layers embedded in a three-matrix structure, each of the metal coating layer has a checker-board coated/uncoated pattern allowing the ceramic/glass matrixes in adjacent layers to grow into and connect each other while providing complete areal coverage to adequately protect the substrate from electromagnetic interference.

20 Claims, 2 Drawing Sheets

METHOD FOR PREPARING MULTILAYER CERAMIC/GLASS SUBSTRATES WITH ELECTROMAGNETIC SHIELDING

FIELD OF THE INVENTION

This invention relates to a method of preparing ceramic/glass substrates with electromagnetic shielding. More particularly, this invention relates to a process for the preparation of multilayer laminated ceramic/glass substrates for use in making hard magnetic information recording disks which contain electromagnetic shielding to protect data and data signals from interference by electromagnetic wave.

BACKGROUND OF THE INVENTION

In recent computer systems, hard magnetic information recording disks, which are often called hard disks or hard drives, have become an integral element for data storage and retrieval. A hard disk comprises two principal components: a magnetic head and rigid magnetic disks (which are often referred to as "hard magnetic disks", or even "hard disks"). The magnetic head writes data onto the rigid magnetic disk through the change of the magnetic field in the magnetic head which is caused by the change of the electric current that flows therethrough in accordance with the output data from the central processing unit. On the other hand, the magnetic head also reads data from the rigid magnetic disk, which induces a voltage in the magnetic head in accordance with the data that have been magnetically stored on the magnetic disk. The voltage so induced is subsequently amplified and converted back into its original digital data form before it is transmitted to the central processing unit.

A rigid magnetic disk comprises a rigid substrate and a layer of magnetic recording medium coated on the surface thereof for magnetically recording information to be stored. To avoid damages that may be caused to the magnetic recording layer due to its frictional contact with the magnetic head, a protective lubricating layer is often coated on top of the magnetic recording layer.

Aluminum alloy is commonly used as the base material to make substrates for the rigid magnetic disks. In the manufacturing of rigid magnetic disks, the aluminum alloy is first cut into a desired shape and size, then fabricated to obtain the desired flatness, surface roughness, and surface texture. The later step is necessary in order to, for example, improve the stickiness between the aluminum substrate and the magnetic recording layer, improve the flying motion of the magnetic head, reduce the friction therebetween, etc. Then a layer of NiP coating often is applied, typically via an electroless plating procedure, to provide a desired hardness at the surface of the aluminum substrate. After the electroless NiP plating, the surface of the aluminum alloy substrate is then uniformly coated with a layer of a magnetic recording composition using a coating or sputtering method. Finally a protective layer is coated on the surface of the magnetic recording layer as discussed above.

The trend in the computer industry is to pursue products that are lighter, thinner, shorter, smaller, speedier and capable of providing higher performance. Consistent with this trend, metallic films such as Co—Cr and Co—Ni, which provide high saturation magnetic density, are becoming the mainstream material in providing the magnetic recording medium for hard disks. Use of these materials requires the use of substrates that have a higher degree of surface flatness and roughness. These materials also require a lower flying height of the magnetic head above the magnetic disk, in order to achieve the purpose of maximizing the density of the stored information. For the reasons that follow, aluminum substrates have severe limitations for use with these materials. First, because of its relatively inferior hardness, an electroless NiP plating must be applied to in order to achieve the required hardness. This complicates the fabricating process, and the flatness of the product made therefrom is still far from ideal. The aluminum substrate also lacks the requisite strength to make very thin substrates. These weaknesses limit the extent by which the size of aluminum substrate based hard disks can be reduced. In addition to the aforementioned problems, an aluminum substrate also suffers from the problem of having relatively high thermal expansion coefficient. This often results in a dimensional instability of the magnetic disk made from the aluminum alloy and causes problems during the tracking of the magnetic head to read data from the rigid magnetic disk.

An aluminum substrate has the advantage that, because it involves a relatively matured technology, the cost for making aluminum based rigid disks is lower. However, due to its severe limitations described above, a need exists in the computer industry to develop new materials that can substitute aluminum alloy to provide improved properties for use as substrates for computer hard disks of the next generation. Recently, it has been disclosed using ceramic, glass, or glass-ceramic to make substrates for computer hard disks. Ceramic materials are well-known to have high hardness and high strength; they also allow the production of substrates with improved surface flatness and roughness. Glass-ceramics are non-porous but have an inherently textured surface. They exhibit good surface hardness which is typically scratch resistant. Furthermore, glass-ceramic articles can be formed as glasses to the designed size and shape, and they often require only a minimum amount of finishing after sintering, thereby reducing the cost of processing.

These advantageous properties enable the substrates made with ceramic or glass materials to be smaller and thinner than their aluminum alloy counterparts. However, both glass and ceramic materials are non-conductors and they do not provide electromagnetic shield. As the hard magnetic disks become thinner and smaller and the data to be stored per unit area of disk space quantum-leaped by orders of magnitude, electromagnetic interference will inevitably become a serious problem for the glass or ceramic based disks and must be dealt with. Furthermore, the demand in substantially increasing the data transfer rate to and from the magnetic disk also creates a much more stringent requirement on the amount of electromagnetic interference that can be tolerated passing through the disk.

In U.S. Pat. No. 4,738,885, it is disclosed a substrate made by molding a powder mixture containing alumina powder, a sintering aid and an organic binder into a doughnut-like disk under a hydraulic press. The molded body was sintered at 1600° C., followed by a hot isostatic pressure treatment at 1,500° C. and 2,000 atmospheres pressure to form a substrate with reduced number of voids on the surface thereof. Finally, the substrate was polished with a diamond abrasive and further polished by lapping and fine polishing.

U.S. Pat. No. 4,833,001 discloses a glass substrate for a rigid magnetic disk having a finely and isotropically roughened surface which is obtained by applying a chemical etching treatment to the glass surface and optionally applying mechanical polishing treatment to the roughened surface. The glass substrates disclosed in the '001 patent often experience surface defects which affect its strength.

U.S. Pat. No. 4,971,932 discloses a substrates made from glass-ceramics by melting glass which is then formed into a glass substrate having desired shapes and geometries using conventional glass forming processes. The glass substrate is then heat-treated to obtain a crystallized phase to thereby enhance its strength. Surface texture with desirable roughness is obtained by controlled nucleation and crystallization of glass of suitable composition which produces a crystalline microstructure. Subsequent mechanical polishing and/or chemical etching is applied to obtain the desired surface roughness.

Japanese Pat. Pub. No. Sho-61-10052 discloses a substrate made from a method similar to that disclosed in the '885 patent, except that it utilizes zirconium oxide and the sintering and hot isostatic pressure treatment are conducted at a different set of conditions. Zirconium oxide is substantially more expensive than aluminum oxide.

Glass and/or ceramic substrates are also disclosed in U.S. Pat. Nos. 4,959,255, 5,087,481, 5,080,948. All of the above-mentioned non-conductor substrates, among other things, share a common problem in that none of them provides the capability to shield interference from electromagnetic waves. In an attempt to deal with this problem, Japanese Pat. No. 2214018 discloses a ceramic substrate which applies a coating of NiP between the ceramic layer and the magnetic recording layer to avoid electromagnetic interference. Japanese Pat. No. 1192015 discloses a similar substrate except that a superconducting material is utilized in place of the NiP plating. The principle of using a superconducting material is to utilize its dia-magnetic property to interrupt the penetration of magnetic field through the magnetic disk. In both patents, the interference problem was handled using a surface treatment that was applied after the substrate has already been made, i.e., after the ceramic green body has been densified. The NiP plating on the ceramic substrate defeats its inherent textured microstructure and the stickiness between the NiP layer and the ceramic substrate, after it has been sintered, is always a concern. Furthermore, the superconducting material requires a working condition below a liquid nitrogen temperature, thus necessarily complicates the problems of parts selection and drastically increases capital as well as operational costs. Other problems with the superconducting approach are also readily apparent, such as the low strength of the superconducting material, its lack of stability, low stickiness, etc. Also the sputtering of the magnetic layer would destroy the superconductivity, thus rendering only a very limited selection of suitable magnetic materials that can be used for successful implementation.

SUMMARY OF THE INVENTION

The present invention was a fruit of many years of concerted research effort by the co-inventors in their desire to develop new and improved substrates that would overcome the aforementioned problems existing in the prior art rigid magnetic disks. The primary object of the present invention, therefore, is to provide a multi-layer ceramic/glass substrate for use in making rigid magnetic disks which retains or enhances all the advantageous properties expected of ceramic/glass substrates while providing the ability to protect the integrity of data signals transferred into and from the rigid magnetic disks by shielding data signals from external electromagnetic interference. The rigid magnetic disk substrate that can be made from the method disclosed in the present invention has many desired qualities such as: light-weight, thin thickness, as well as excellent strength, hardness, flatness, and dimensional stability. In addition to electromagnetic shielding, it also has the desired surface roughness and texture. The method disclosed in the present invention avoids many technical difficulties and will reduce the cost of making ceramic/glass based substrates and computer rigid disks.

In the process disclosed in the present invention, a plurality of ceramic/glass precursory matrixes (which are often called ceramic green tapes or green sheets) are first prepared from an inorganic slurry containing ceramic/glass powders and other additives. At least one of the ceramic/glass precursory matrixes is coated with a metallic layer before densification (typically by sintering). An un-coated ceramic/glass precursory matrix is then stacked on top of the metal-coated matrix in a head-to-tail fashion (i.e., the metal layer is sandwiched between the two ceramic/glass matrixes). The stacked precursory matrixes are then laminated and sintered under pressure and/or temperature to form a densified substrate.

If the final substrate contains two or more of such metal-coated matrixes, each of the metal coating layer can be made to have a complementary on-and-off, i.e., coated-and-uncoated pattern. The off (blank or uncoated) portion in the metal coating layer allows two adjacent ceramic/glass matrixes to grow therethrough and adhere to each other during the lamination and/or sintering stage. Because the metal coating layer either individually or collectively provides a complete areal coverage relative to the substrate, interference from electromagnetic wave can be effectively shielded. Furthermore, because the metal coating layer is laminated and sintered with the ceramic/glass matrix, strong bonding can be established therebetween and the strength of the resultant substrate will be minimally, if any, adversely affected.

BRIEF DESCRIPTION OF THE DRAWINGS

FIG. 1-B is a side view of a coated precursory ceramic/glass matrix.

FIG. 1-C is a side view of an unlaminated and unsintered precursory ceramic/glass substrate containing one uncoated precursory ceramic/glass matrix stacked on top of two coated precursory ceramic/glass matrixes.

DETAILED DESCRIPTION OF THE INVENTION

Figure 1A:
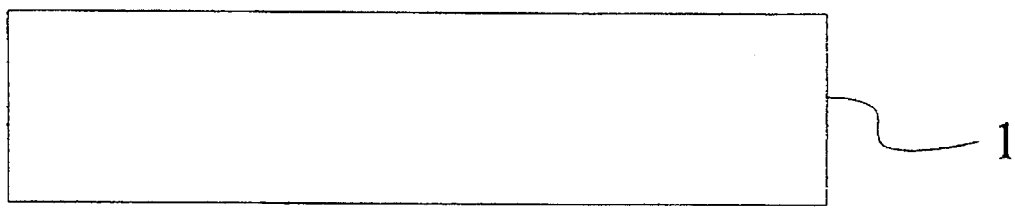
FIG. 1-A is a side view of an uncoated precursory ceramic/glass matrix.
Figure 1B:
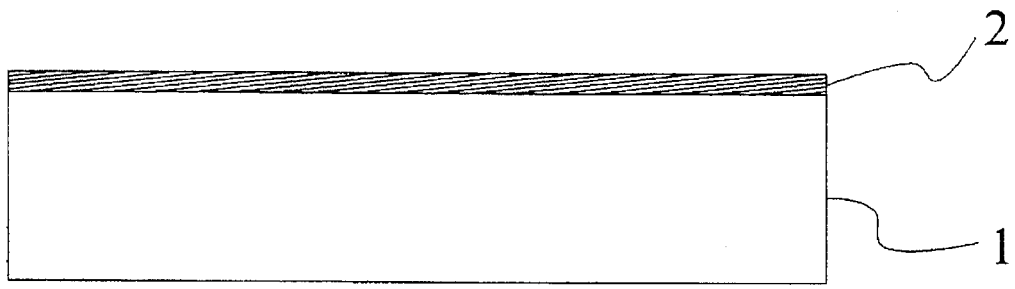
Figure 1C:
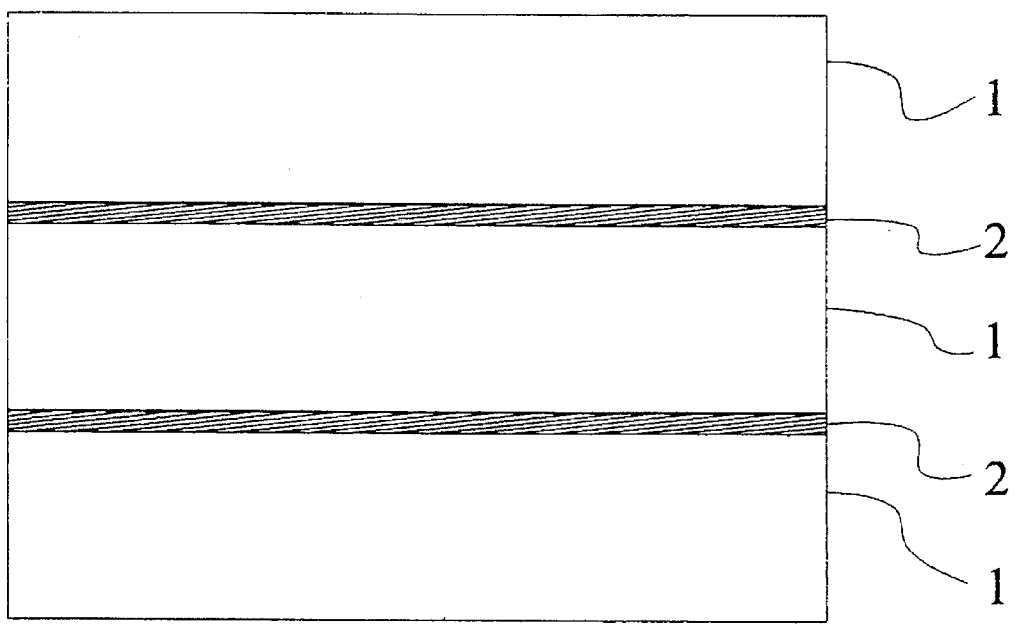

Now referring to the drawings. In FIGS. 1-A through 1-C, it is shown a schematic illustration of the steps involved in making the substrate according to the method disclosed in the present invention. An inorganic slurry containing ceramic and/or glass powder is first prepared and formed into a precursory matrix (or the so-called ceramic green tape or green sheet), shown as 1 in FIG. 1-A. The precursory matrix 1 is cut into an appropriate size and shape, such as the one shown in FIG. 2 and a thin conductive metal coating 2 is applied on the ceramic/glass precursory matrix to form a coated precursory matrix as shown in FIG. 1-B. An uncoated precursory substrate, as shown in FIG. 1-A, is stacked on top of at least one of the metal coated precursory matrix, shown in FIG. 1-B in a head-to-tail manner such that the metal coating is always facing up and sandwiched between two of the precursory ceramic/glass matrixes. FIG. 1-C shows an uncoated ceramic/glass precursory matrix stacked on top of two stacked coated ceramic/glass precursory matrixes. Finally the stacked layers are laminated and sintered to remove organic additives such organic binders and form a densified ceramic/glass substrate containing electromagnetic shielding. Each of these steps is described in more detail below.

Step 1: Preparing an inorganic slurry composition. In preparing the ceramic/glass substrate of the present invention, an inorganic slurry is first prepared from a mixture that may contain at least a ceramic or glass powder, or mixture thereof, an aqueous or organic solvent, a polymeric binder resin, a plasticizer, and other appropriate additives. The mixture is thoroughly blended and milled using a ball mill for about 6 to 24 hours to homogenize the mixture, break up agglomerates and reduce its particle size. A homogeneous inorganic slurry is thus obtained.

The ceramic powder that can be used in making the inorganic slurry can be aluminum oxide, zirconium oxide, titanium oxide, forsterite ($Mg_2SiO_4$), mullite ($Al_6Si_2O_{13}$), magnesium oxide, quartz, chromium oxide or other physically and chemically stable oxides. The average particle size of the ceramic powder is preferably below 7 µm, or more preferably between 0.5 and 3 µm.

The glass powder that can be used in making the inorganic slurry can be silicate glass, borosilicate glass, sodium calcium silicate glass or any other appropriate glass. The composition of the glass powder can be 30–70% (weight) silicon dioxide, 0–35% boron oxide, 5–35% aluminum oxide, 1–20% alkali metal oxide, and 1–25% alkali earth metal oxide. The average particle size of the glass powder is preferably less than 10 µm, or more preferably between 2 and 3 µm.

In preparing the inorganic slurry composition, the mixture can contain only the ceramic powders, only the glass powders, or a mixture thereof. If the inorganic slurry composition contains only ceramic powders, other than the necessary additives such as solvent, binder and plasticizers, it is preferred, for the reasons that follow, that several different types of ceramic powders be used. When a blend of various types of ceramic powders are used, some of the powders will constitute the principal crystal phase after sintering. Whereas other ceramic powders will then either serve as a sintering aid, or form a liquid or glass phase, which will also aid the sintering of the ceramic powders. The latter circumstances can be illustrated using aluminum oxide, a ceramic powder, as an example. Depending on the composition of the ceramic slurry, the aluminum oxide powder can serve either function when it is used as a component in preparing the inorganic slurry composition. In one situation, wherein the inorganic slurry composition, other than the additives, contained 99.6 wt % $Al_2O_3$, and 0.4 wt % MgO, the function of MgO was to serve as a sintering aid. In another situation, in which the slurry composition contained about 90–96 wt % $Al_2O_3$, which formed the principal crystal phase, other ceramic powders, which included 0.2–4 wt % MgO, 1–4 wt % CaO, and 1–4 wt % $SiO_2$, formed a glass phase during the sintering process that also aided in the sintering of the ceramic powders.

As disclosed hereinabove, the slurry composition can also be comprised entirely of glass powders, in addition to the usual additives. In order to increase the strength of the substrate entirely made of glass powders, it is preferable to use crystallizable glass composition, such as magnesium aluminum silicate glass, or lithium aluminum silicate glass.

During the sintering stage or the subsequent re-heating, particulates having microscopic crystalline structure can be crystallized from the glass phase which provide the desired strength for the glass substrate. Because of their relatively high hardness, these particulates will protrude from the surface after polishing to form a desirable surface texture.

The slurry composition can also comprise, and preferably so, a mixture of ceramic and glass powders. The respective proportions of the components thereof can be freely adjusted according to the need and what the situation calls for. The weight percentage of ceramic powder, individually or collectively if there are more than one type of ceramic powders, can range from 0 to 100 percent, and, likewise, that of the glass powder or powders can also range from 0 to 100 percent. An important criterion in determining the weight percentage of either component is that the substrate to be formed therefrom should have a sintered density greater than about 99%, good mechanical strength, and have voids and defects less than 1 µm. When a mixture containing ceramic and glass powders is used in preparing the rigid disk substrate, because the ceramic powder has a relatively higher hardness, some of the ceramic particulates will protrude from the polished surface and form a desirable surface texture. Such a microscopic surface texture improves its stickiness with a coating layer such as a magnetic recording layer that is subsequently applied on the substrate during the fabrication process.

The organic solvent to be used in making the slurry composition can be methanol, ethanol, n-butanol, isopropanol, toluene, methyl ethyl ketone, methyl isobutyl ketone, or the mixture thereof. The weight percentage of the organic solvent generally is proportional to the weight of the ceramic powder.

A variety of polymeric binders, such as polyvinyl butyral, polyvinyl alcohol, methyl or ethyl cellulose, polymethyl methacrylate, acrylic resins, etc, can be used in the present invention. Suitable plasticizers include di-butyl phthalate, dioctyl phthalate, butyl benzyl phthalate, polyethylene glycol, etc.

Step 2: Preparing a precursory ceramic/glass matrix. After the slurry composition is prepared according to the method describe above, a precursory ceramic/glass matrix can be made therefrom using a tape casting, extrusion, coating, or pressing technique. The preferred thickness of the precursory ceramic/glass matrix is about 0.1–1.0 mm.

Figure 2:
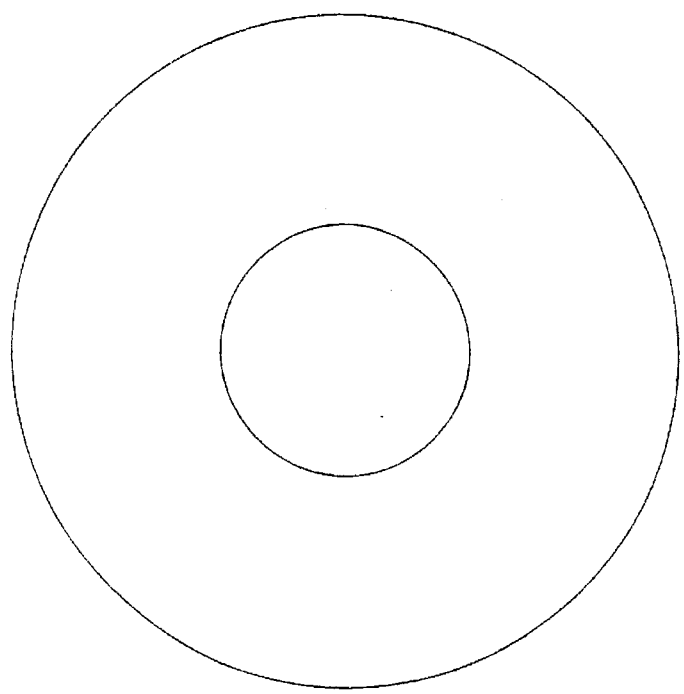
FIG. 2 shows a top view of a doughnut-shaped ceramic/glass matrix.

Step 3: Cutting the precursory ceramic/glass matrix into a desired shape and size. When the intended use of the precursory ceramic/glass matrix is to make substrates for rigid magnetic disks, it is typically cut into a desired shape and size such as the doughnut shape as shown in FIG. 2.

Figure 3:
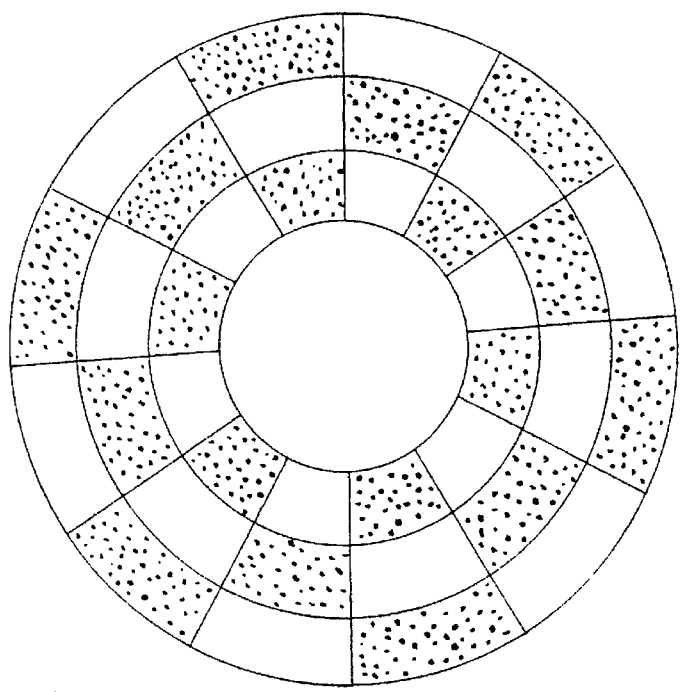
FIG. 3 shows a circular checker-board pattern of the metal coating layer when the ceramic/glass substrate contains two or more of the metal coating layers to provide a complementary areal shielding effect.

Step 4: Applying a conductive metal coating layer on the precursory ceramic/glass matrix. To impart the electromagnetic shielding capability of the final substrate, a conductive metal coating layer is applied onto the precursory ceramic/glass matrix using the method of screen printing, spraying, or coating. If only one such conductive metal layer is to be provided, the coating should be a uniform and complete layer without any blank spots to provide complete areal coverage. However, if the substrate is designed to contain more than one metal layer, each layer does not have to exhibit a ubiquitous coating coverage but can have a predetermined on/off, or coated/uncoated, pattern. A preferable pattern of the metal coating layer is shown in FIG. 3. In FIG. 3 the metal layer is shown to have a circular checker-board pattern, with an alternating sectors of coated and uncoated sectors in both the radial and the circumferential directions.

Such a check-board pattern improves the stickiness between adjacent ceramic/glass layers in a laminated and sintered substrate, and is particularly useful if the substrate contains two metal layers. In the circular checker-board pattern, the two metal layers are rotated at a 90 degrees phase relative to each other and collectively, as the two layers which are complementary to each other, provide complete areal coverage to shield electromagnetic interference. The distance between coated sectors and the thickness of the metal coating are determined by the anticipated magnitude and the wavelength of the electromagnetic field. Generally speaking, the sector width is preferably less than 0.2 mm and the thickness of the metal coating is preferably about 2–30 µm. If enough adhesion strength can be obtained between the metal coating and the ceramic/glass precursory matrix, a blanket type coating layer will be adequate, and no patterned coating or uncoated sectors are necessary. The thickness of the metal coating layer should be such that the substrate will not warp or crack during co-firing, and that it can competently shield the electromagnetic interference. After the precursory matrix is coated with the metal layer, it is dried at 80°–130° C. for 5–20 minutes.

Suitable metals that can be used to form the coating layer include: gold, platinum, silver, palladium, molybdenum, tungsten, copper, or alloys made therefrom. NiP alloys or other non-magnetic conductive metals that can withstand high temperature can also be used to provide the metallic coating layer. The particle size of the metal powders should be less than 10 µm.

Step 5: Lamination. If two or more metal-coated precursory matrixes are to be utilized in preparing the ceramic/glass substrate, they are first stacked on top of each other in an orderly manner, i.e., the ceramic/glass layer of one precursory matrix will be stacked adjacent to the metal layer of another precursory matrix. Finally, a layer of uncoated precursory matrix is stacked on top of the stack. Of course, if the substrate contains only one metal-coated layer, the uncoated precursory will be stacked directly onto the top, i.e., the metal layer, of the coated precursory substrate. The stacked layers of coated and uncoated precursory matrixes are then placed inside a laminator and molded into an integral body under temperature and pressure for about 5–20 minutes. The preferred temperature range is 50°–120° C. and the preferred pressure range is 1,000–5,000 psi. The metal layer or layers which are sandwiched inside the laminated precursory substrates provide the shielding effect against electromagnetic interference.

Step 6: Sintering. After lamination, the precursory substrates are placed on a metal or ceramic setter and sent into a co-firing furnace, which provides debindering and sintering functions. The temperature in the furnace increases first at a rate of 1°–10° C./min until it reaches 300°–600° C. The furnace temperature remains constant at such temperature for 0.5–4 hours to remove the organic components in the precursory matrix (i.e., debindering). Thereafter, its temperature is increased at a rate of 2°–15° C./min until it reaches 800°–1,700° C. and stay at that temperature for about 1–4 hours to cause the ceramic/glass powder to become sintered and densified. Then cooling means is applied to reduce the furnace temperature at a rate of 1–15° C./min until room temperature is reached. The final product is a high strength, high hardness and densified ceramic/glass substrate with a metallic electromagnetic shielding. Depending on the type of the coating metal used, the sintering atmosphere can be air, nitrogen, hydrogen, or a nitrogen/hydrogen mixture. A small amount of water vapor (100 ppm–2 wt %) at an appropriate dew point can be introduced into the sintering atmosphere to reduce carbon residue and improve the sintering density. However, the sintering atmosphere should preferably be maintained at a reducing condition, thereby to avoid oxidation of the metal layer.

Step 7: Sizing. After sintering, the substrate is mechanically fabricated to obtain the desired size, shape, and flatness.

Step 8: Surface Polishing. Finally, the surface of the substrate is polished to various degrees according to the need of each specification. For example, if the substrate is to be used in a hard disk, the surface roughness should be such that its Ra is less than 0.01 µm.

If the substrate comprises primarily glass material, with about 5–50 wt % of ceramic material contained therein, then some of the ceramic particles will slightly protrude out of the surface to form a texture after the polishing step. This is because of the relatively higher hardness of the ceramic particles. On the other hand, if the substrate comprises primarily ceramic material and a lesser amount of glass material, then the microstructure after sintering will contain a crystalline ceramic phase and a noncrystalline glass phase. The proportion of the glass phase depends on the composition of the substrate. Because glass has a relatively lower hardness, during the polishing process, the glass phase will sink below the surface. This also generates a surface texture. Surface texture improves stickiness between the substrate and a coating layer, such as the magnetic recording coating, that may be applied on the surface of the substrate. Furthermore, if the substrate is used in hard disks, such surface texture can also reduce friction between the magnetic head and the magnetic disk and facilitate easier take-off and landing of the magnetic head.

After having described the general procedures of preparing the multi-layer ceramic/glass substrates of the present invention, the following examples are provided to further enable those skilled in the art to practice the same. These examples are presented to describe preferred embodiments and utilities of the method disclosed in the present invention and are not meant to limit the present invention unless otherwise stated in the claims appended thereto.

EXAMPLE 1

A slurry mixture containing 25.8 wt % of borosilicate glass powder, 31.5 wt % of aluminum oxide powder, 37.1 wt % of organic solvent (containing an equal mixture of methyl ethyl ketone and isopropyl alcohol), 3.4 wt % of polymeric binder (polyvinyl butyral), 1.1 wt % each of dibutyl phthalate and dioctyl phthalate, both added as are plasticizers, was blended using a ball mill for 10 hours. The borosilicate glass powder contained 57 wt % $SiO_2$, 25 wt % $B_2O_3$, and 10 wt % $Al_2O_3$. The rest of the borosilicate glass powder contained a mixture of viscosity reducers (flux), including 1.5 wt % $Li_2O$, 1.5 wt % MgO, and 5 wt % CaO. The resultant slurry was tape cast on a polymer film to form a precursory ceramic/glass matrix having a thickness of 0.5 mm. After it was dried, the precursory ceramic/glass matrix was cut into the doughnut shape as shown in FIG. 2.

A metal paste containing silver and palladium powders was prepared and coated onto the precursory ceramic/glass matrix using a screen printing technique according to the pattern shown in FIG. 3. The metal-coated precursory ceramic/glass matrix was dried at 120° C. for 5 minutes. The thickness of the metal paste layer was measured to be 10 µm. Two of the metal-coated ceramic/glass matrixes are stacked on top of each other with the metal layers facing up and one of the metal layers separating the ceramic/glass matrixes, as shown in FIG. 1-C. Because the two metal layers are complete complement of each other, collectively they provide a complete areal coverage over the surface of the green tape. Finally an un-coated precursory ceramic/glass matrix was stacked on top of the two metal-coated ceramic/glass matrixes to form an unlaminated and unsintered precursory substrate, as shown in FIG. 1-C. The stacked precursory substrate was then placed inside a laminator and laminated under a 3,000 psi pressure and 65° C. temperature for 10 minutes until the stacked matrixes were laminated. Because of the metal layers that are embedded therewithin, the precursory substrate is provided with shielding effect against electromagnetic interference.

The laminated precursory substrate was then placed on an aluminum oxide plate and placed inside a co-firing furnace. The temperature of the furnace was increased at a rate of 3° C./min until it reached 600° C. The temperature of the furnace remained at 600° C. for one hour to remove all the organic components. Thereafter, the furnace temperature was increased to 900° C. at which temperature the laminated precursory substrate was sintered for two hours. Finally, the temperature of the furnace was reduced at 3° C./min until it reached room temperature. The substrate so obtained was a sintered and densified substrate.

After the above procedures, the sintered substrate was cut and trimmed to the right size, and polished to the right thickness and flatness, and a surface roughness having Ra≦0.01 μm.

EXAMPLE 2

A slurry mixture containing 56 wt % of aluminum oxide powder (average particle size 2 μm), with 0.5 wt % of magnesium oxide, 1.2 wt % of calcium oxide, 1.7% silicon oxide, 0.4 wt % titanium oxide, and 0.9 wt % of chromium oxide added as flux, 30.9 wt % of toluene as organic solvent, 4.2 wt % of polyvinyl butanone as binder, and 2.1 wt % dibutyl phthalate and 2.1 wt % dioctyl phthalate as plasticizer, was blended using a ball mill for 10 hours. The resultant slurry was tape cast on a polymer film to form a precursory ceramic matrix having a thickness of 0.5 mm. After it was dried, the precursory ceramic matrix was cut into the shape as shown in FIG. 2.

A metal paste containing tungsten powder was prepared and coated onto the precursory ceramic matrix using a screen printing technique according to the pattern shown in FIG. 3. The metal-coated ceramic matrixes were dried at 120° C. for 5 minutes. The thickness of the metal paste layer was measured to be 10 μm. Then two of the metal-coated ceramic matrixes are stacked one on top of the other with the metal layers facing up and one of the metal layers separating the ceramic matrixes, as shown in FIG. 1-C. Because the two metal layers are complete complement of each other, collectively they provide a complete areal coverage over the surface of the ceramic matrixes. Finally an un-coated ceramic matrix was stacked on top of the two stacked metal-coated ceramic matrixes to form an unlaminated and unsintered stacked precursory substrate as shown in FIG. 1-C. The stacked precursory substrate was then placed inside a laminator and laminated under a 3,000 psi pressure and 65° C. for 10 minutes until the precursory matrixes were laminated. Because of the two complementary metal layers that are embedded therewithin, the substrate provides shielding effect from electromagnetic interference.

The laminated substrate was then placed on a molybdenum plate and placed inside a furnace. The atmosphere of the furnace was an $N_2/H_2$ mixture at a ratio of 3:1. and its temperature was increased at a rate of 3° C./min until it reached 600° C. When the temperature of the furnace reached above 450° C., a water vapor with a dew point of 25° C. was added to the atmosphere of the furnace. The temperature of the furnace remained at 600° C. for two hours to faciliate the removal of all the organic components. The addition of the water vapor faciliated the removal of the organic components or residual carbon while the atmosphere was still maintained at a reducing state to prevent the oxidation of the metal component. Thereafter, the furnace temperature was increased at a rate of 6° C./min to 1,600° C. and maintained there for two hours to promote sintering. Finally, the temperature of the furnace was reduced at 3° C./min until it reached room temperature. The substrate so obtained was a sintered and densified substrate.

After the above procedures, the sintered substrate was cut and trimmed to the right size, and polished to the right thickness and flatness, and a surface roughness having Ra≦0.01 μm.

The forgoing descriptions of examples including preferred embodiments of this invention have been presented for purposes of illustration and description. It is not intended to be exhaustive or to limit the invention to the precise form disclosed. Obvious modifications or variations are possible in light of the above teachings. The embodiments were chosen and described to provide the best illustration of the principles of this invention and its practical application to thereby enable one of the ordinary skill in the art to utilize the invention various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. A method for preparing multilayer ceramic or glass substrates with electromagnetic shielding for use in making computer hard discs, said method comprising the steps (a) preparing a slurry composition comprising at least one member selected from the group consisting of ceramic powders and glass powders, an aqueous or organic solvent, a polymeric binder resin, and a plasticizer;

(b) blending and milling said slurry composition to form a homogeneous slurry;

(c) preparing a plurality of precursory ceramic or glass matrixes from said slurry;

(d) cutting each of said precursory ceramic or glass matrixes into a predetermined shape and size;

(e) applying a conductive metal coating layer on at least two of said precursory ceramic or glass matrixes to form at least two metal-coated precursory ceramic or glass matrix, each of said metal coating layers having a predetermined coated/uncoated pattern such that collectively said at least two of said metal coating layers are capable of providing a ubiquitous areal coverage for said substrate;

(f) stacking at least an uncoated said precursory ceramic or glass matrix and said at least two of said metal-coated precursory matrixes together in a head-to-tail manner to form a stacked multilayer precursory substrate, wherein said metal-coated matrixes are arranged in such a manner that the metal-coated portions thereof collectively provide a ubiquitous areal shield to protect said ceramic/glass matrix against magnetic interference;

(g) laminating said stacked multilayer precursory substrate under a predetermined temperature and pressure to form a laminated precursory substrate;

(h) sintering said laminated precursory substrates in a furnace to form a sintered substrate, wherein said sintering procedure causing said ceramic matrixes to grow through said uncoated portions of said metal-coated matrixes and into each other so as to allow said metal coating layers to be firmly laminated with the ceramic or glass layers to form an integrated ceramic or glass substrate with magnetic shield; and (i) trimming and polishing said sintered substrate to obtain a predetermined size, shape, flatness and roughness.

2. The method of preparing multilayer ceramic or glass substrate of claim 1 wherein said ceramic powder is selected from the group consisting of aluminum oxide, zirconium oxide, titanium oxide, forsterite ($Mg_2SiO_4$), mullite ($Al_6Si_2O_{13}$), magnesium oxide, quartz, and chromium oxide.

3. The method of preparing multilayer ceramic or glass substrate of claim 1 wherein the average particle size of the ceramic powder is below 7 μm.

4. The method of preparing multilayer ceramic or glass substrate of claim 1 wherein the average particle size of the ceramic powder is between 0.5 and 3 μm.

5. The method of preparing multilayer ceramic or glass substrate of claim 1 wherein said glass powder is selected from the group consisting of silicate glass, borosilicate glass, and sodium calcium silicate glass.

6. The method of preparing multilayer ceramic or glass substrate of claim 1 wherein the average particle size of said glass powder is less than 10 μm.

7. The method of preparing multilayer ceramic or glass substrate of claim 1 wherein the average particle size of said glass powder is between 2 and 3 μm.

8. The method of preparing multilayer ceramic or glass substrate of claim 1 wherein said organic solvent in preparing said slurry composition is selected from the group consisting of methanol, ethanol, n-butanol, isopropanol, toluene, methyl ethyl ketone, methyl isobutyl ketone, and mixtures thereof.

9. The method of preparing multilayer ceramic or glass substrate of claim 1 wherein said binder is selected from the group consisting of polyvinyl butyral, polyvinyl alcohol, methyl cellulose, ethyl cellulose, polymethyl methacrylate, acrylic resins, and mixtures thereof.

10. The method of preparing multilayer ceramic or glass substrate of claim 1 wherein said plasticizer is selected from the group consisting of di-butyl phthalate, dioctyl phthalate, butyl benzyl phthalate, polyethylene glycol, and mixtures thereof.

11. The method of preparing multilayer ceramic or glass substrate of claim 1 wherein said precursory ceramic/glass matrix is prepared from said slurry using a technique selected from the group consisting of tape casting, extrusion, coating, and pressing techniques.

12. The method of preparing multilayer ceramic or glass substrate of claim 1 wherein said precursory ceramic or glass matrix has a thickness of 0.1 to 1.0 mm.

13. The method of preparing multilayer ceramic or glass substrate of claim 1 wherein said metal is selected from the group consisting of gold, platinum, silver, palladium, molybdenum, tungsten, copper, NiP, and alloys thereof.

14. The method of preparing multilayer ceramic or glass substrate of claim 1 wherein said metal coating layer is applied onto said precursory ceramic or glass matrix using screen printing or spraying method.

15. The method of preparing multilayer ceramic or glass substrate of claim 1 wherein said stacked multilayer precursory substrate is laminated at temperatures ranging from 50° to 120° C. and pressures ranging from 1,000 to 5,000 psi.

16. The method of preparing multilayer ceramic or glass substrate of claim 1 wherein said sintering is effectuated by the steps of:

(a) increasing the temperature of the furnace at a rate of 1°–10° C. per minute until it reaches 300°–600° C.;

(b) maintaining the furnace temperature at 300°–600° C. for 0.5–4 hours to remove the organic components in the precursory matrix;

(c) increasing the furnace temperature at a rate of 2°–15° C. per minute until it reaches 800°–1,700° C.;

(d) maintaining the furnace temperature at 800°–1,700° C. for about 1–4 hours to cause the ceramic or glass powder to become sintered and densified;

(e) reducing the furnace temperature at a rate of 1°–15° C. per minute until it reaches room temperature.

17. The method of preparing multilayer ceramic or glass substrate of claim 1 wherein said sintering step takes place in an atmosphere which is air, nitrogen, hydrogen, or a nitrogen/hydrogen mixture.

18. The method of preparing multilayer ceramic or glass substrate of claim 1 wherein said atmosphere contains 100 ppm to 2 wt % of water vapor.

19. The method of preparing multilayer ceramic or glass substrate of claim 1 wherein said substrate contains two metal-coated matrixes, and each of said metal coating layers provided thereon having a plurality of coated/uncoated sectors arranged in a circular checker-board pattern and said metal-coated matrixes are stacked such that their coating layers are rotated at 90 degrees with respect to each other.

20. The method of preparing multilayer ceramic or glass substrate of claim 19 wherein the width of said sector is less than 0.2 mm and the thickness of said metal coating is about 2–30 μm.

* * * * *